US007475384B2

(12) United States Patent
Heath et al.

(10) Patent No.: US 7,475,384 B2
(45) Date of Patent: Jan. 6, 2009

(54) BINDING TO TYPES

(75) Inventors: Iain C Heath, Redmond, WA (US); Joseph P Stegman, Newcastle, WA (US); Mark A Boulter, Issaquah, WA (US); Steven M Lasker, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 10/968,207

(22) Filed: Oct. 19, 2004

(65) Prior Publication Data

US 2006/0150172 A1 Jul. 6, 2006

(51) Int. Cl.
*G06F 9/44* (2006.01)
(52) U.S. Cl. .................... 717/114; 717/116
(58) Field of Classification Search ........ 717/114–116, 717/148, 153, 162–167, 106–109; 719/319–320, 719/328–329; 715/700
See application file for complete search history.

(56) References Cited

U.S. PATENT DOCUMENTS

| 5,740,439 | A * | 4/1998 | Atkinson et al. ............. 719/320 |
| 6,330,006 | B1 * | 12/2001 | Goodisman ................. 715/762 |
| 6,401,099 | B1 * | 6/2002 | Koppolu et al. .......... 707/103 R |
| 6,553,384 | B1 * | 4/2003 | Frey et al. ............... 707/103 R |
| 6,662,236 | B1 * | 12/2003 | Apte et al. .................. 719/320 |
| 6,757,900 | B1 * | 6/2004 | Burd et al. ................. 719/316 |
| 6,999,102 | B2 * | 2/2006 | Felser et al. ................ 345/619 |
| 7,055,134 | B2 * | 5/2006 | Schroeder ................... 717/120 |
| 7,155,705 | B1 * | 12/2006 | Hershberg et al. .......... 717/137 |
| 7,171,655 | B2 * | 1/2007 | Gordon et al. .............. 717/146 |
| 7,401,327 | B2 * | 7/2008 | Halstead et al. ............. 717/140 |
| 2002/0019843 | A1 * | 2/2002 | Killian et al. ............... 709/102 |
| 2002/0184610 | A1 * | 12/2002 | Chong et al. ................ 717/109 |
| 2003/0105887 | A1 * | 6/2003 | Cox et al. ................... 709/328 |
| 2003/0163603 | A1 * | 8/2003 | Fry et al. .................... 709/328 |
| 2004/0021679 | A1 * | 2/2004 | Chapman et al. ........... 345/700 |
| 2004/0128644 | A1 * | 7/2004 | Hurst et al. ................. 717/100 |
| 2007/0130572 | A1 * | 6/2007 | Gilbert et al. .............. 719/318 |

OTHER PUBLICATIONS

Thuan Thai, et al. ".NET Framework Essentials" Aug. 11, 2003, O'Reilly Media, Inc; 3 edition, p. 4, p. 50, p. 88, p. 251.*

(Continued)

*Primary Examiner*—Wei Y Zhen
*Assistant Examiner*—Anna Deng
(74) *Attorney, Agent, or Firm*—Amin, Turocy & Calvin, LLP (57) ABSTRACT

A system and method for system and method data binding to type(s) of object(s) is provided. The system can be employed in a software application development environment to facilitate data binding to types of entity(ies) rather than instance(s) of the entity(ies). The system includes a binding source component that supports the ability to set its data source to a type, rather then a specific instance. For example, when the data source is changed, the binding source component can evaluate whether the data source (e.g., object) can be instanced and whether the data source (e.g., object) supports necessary designer interface(s). If the type isn't supported by the designer, using reflection, the binding source component can interrogate the public properties of the type. Additionally, the binding source component can analyze complex object(s).

18 Claims, 5 Drawing Sheets

OTHER PUBLICATIONS

Damien Watkins, et al. "Programming in the .NET Environment", Nov. 6, 2002, Addison-Wesley Professional; 1st edition, p. 5, p. 38, p. 48, p. 253.*

Drape et al. "Transforming the .NET intermediate language using path logic programming", Oct. 2002, ACM, pp. 133-144.*

Gorla et al. "Controlling Data Movement in Global Comp;uting Applications", Mar. 2004, ACM, pp. 1462-1467.*

Farwer et al. "Model Checking Object Petri Nets in Prolog", Aug. 2004, ACM, pp. 20-31.*

DataConnector Component Overview, MSDN Visual Studio 2005 Library, 2004, 3 pages, http://msdn2.microsoft.com/library/xxxf124e.pf, last viewed Jan. 17, 2005.

Robert Green, Walkthrough: Smart Client Data in Visual Basic 2005, MSDN Library, 2005, 19 pages, http://msdn.microsoft.com/library/en-us/dnvs05/html/smartclient_vb2005.asp?frame=true, last viewed Jan. 17, 2005.

DataConnector Members, MSDN Visual Studio 2005 Library, 2004, 5 pages, http://msdn2.microsoft.com/library/h1h86yb1.pf, last viewed Jan. 17, 2005.

* cited by examiner

BINDING TO TYPES

TECHNICAL FIELD

The subject invention relates generally to software development tools, and more specifically, to a system and method data binding to type(s) of object(s).

BACKGROUND OF THE INVENTION

Software vendors are continually advancing the latest in development tools for users to take advantage of software made available to consumers. Typically, such tools require some level of familiarity by developer with the tool(s) language and structure in order to use the development tool(s) and develop the appropriate interface. However, the rapid evolution in which such development frameworks are manufactured and sold impact the speed with which such tools can be understood and used to provide the software for which they are created. Developers are still left spending an inordinate amount of time learning and struggling with the development environment in order to provide a suitable product for a customer.

Conventional development tools have supported data binding to object(s); however, there was limited design-time support. In order to enable design-time support, developer(s) implemented base class(es) that inherited from a specific base class and/or implemented several interface(s). The addition of these base class(es) and/or interface(s) was time-consuming and added limited, if any, value at run-time.

Further, many developers require the ability to limit the creation of their object without providing specific parameters at construction of the object. Because of the varied design patterns, developers were very limited in participation in data binding from even a runtime perspective, much less a design time perspective.

Data binding in conventional system(s) required the ability to query an object for the available properties. If the object was not capable of being instanced, the system was unable to produce a list of bindable properties. Finally, with conventional system(s), once data binding has been established, there is no mechanism for changing the source of the data binding.

SUMMARY OF THE INVENTION

The following presents a simplified summary of the subject invention in order to provide a basic understanding of some aspects of the subject invention. This summary is not an extensive overview of the subject invention. It is not intended to identify key/critical elements of the subject invention or to delineate the scope of the subject invention. Its sole purpose is to present some concepts of the subject invention in a simplified form as a prelude to the more detailed description that is presented later.

The subject invention provides for a system and method data binding to type(s) of object(s). The system can be employed in a software application development environment to facilitate data binding to types of entity(ies) (e.g., object(s), web service(s) and/or a hierarchy of objects) rather than instance(s) of the entity(ies). With the ability to bind to types, the system provides the ability to abstract schema by which the control(s) are bound from the source of data. The system allows developer(s) and/or architect(s) to specify their own base classes for their own object(s).

The system includes a binding source component that supports the ability to set its data source to a type, rather then a specific instance. For example, when the data source is changed, the binding source component can evaluate whether the data source (e.g., object) can be instanced and whether the data source (e.g., object) supports necessary designer interface(s).

If the type isn't supported by the designer, using reflection, the binding source component can interrogate the public properties of the type. Additionally, the binding source component can analyze complex object(s).

For example, at design-time, a developer builds a form with control(s) data bound to a typed data set. Through the data binding, each control contains a reference to the typed data set scoped to the form. At run-time, as the end user of the application employs the control(s) (e.g., presses a button on the form), the application retrieves a new instance of the typed data set. The end user can switch the source of the data binding from, for example, a test database to a production database.

To the accomplishment of the foregoing and related ends, certain illustrative aspects of the subject invention are described herein in connection with the following description and the annexed drawings. These aspects are indicative, however, of but a few of the various ways in which the principles of the subject invention may be employed and the subject invention is intended to include all such aspects and their equivalents. Other advantages and novel features of the subject invention may become apparent from the following detailed description of the subject invention when considered in conjunction with the drawings.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the subject invention.

As used in this application, "control" refers to a component having an associated visual representation (e.g., user interface).

Figure 1:
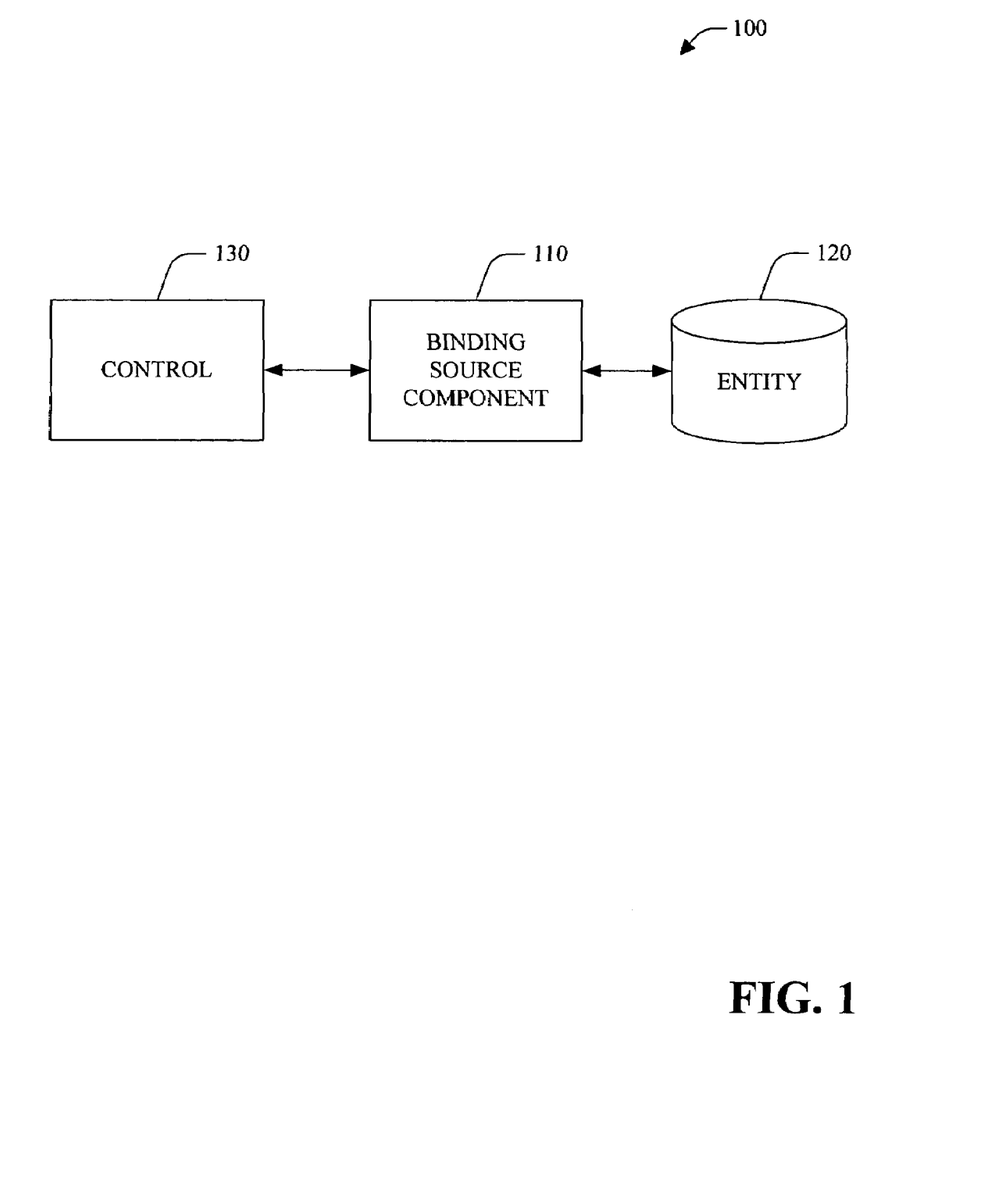
FIG. 1 is a block diagram of a system for data binding to a type of object in accordance with an aspect of the subject invention.

Referring to FIG. 1, a system 100 for data binding to a type of object in accordance with an aspect of the subject invention is illustrated. The system 100 can be employed in a software application development environment to facilitate data binding to types of entity(ies) (e.g., object(s)) rather than instance(s) of the entity(ies). With the ability to bind to types, the system 100 provides the ability to abstract schema by which the control(s) are bound from the source of data. The system 100 allows developer(s) and/or architect(s) to specify their own base classes for their own object(s) that that do not require specific inheritance, interface implementation or default public constructors. Data binding can include, for example, creation of control(s), label(s) for the control(s) and/or naming of the control(s) based on the entity(ies)' bound property(ies).

The system 100 includes a binding source component 110, an entity 120 and a control 130. The binding source component 110 can be a control. The binding source component 110 provides a level of indirection at design-time and run-time between the control 130 and the entity 120. The level of indirection alleviates the need for user(s) to reset their data binding(s) or merge data sets.

With conventional system(s), a control was tightly-bound to an entity (e.g., database). Changes to the communication mechanism between the control and entity were generally accomplished in code, were confusing and complicated.

With the level of indirection provided by the binding source component 110, the entity 120 can be changed, for example, from a first database to a second database with a similar shape (e.g., schema). The data binding of the control 130 is accomplished by the binding source component 110, without changes to the control by the user (e.g., developer and/or end-user). For example:

TABLE 1

```
private BindingSource                    _dc;
private void Initialize( )
{
    _dc = new BindingSource( );
    // Bind to the data connector (supported at design time)
    this.authorsDataGridView.DataSource = _dc;
    // Bind to the data connector (supported at design time)
    this.priceLabel.DataBindings.Add("Text", _dc, "Price");
    this.publishDateLabel.DataBindings.Add("Text", _dc,
    "PublishDate");
    this.ISBNLabel.DataBindings.Add("Text", _dc, "ISBN");
```

TABLE 1-continued

```
}
public void AuthorSelected( )
{
    ds = service.GetBooksByAuthor(this.AuthorTextBox.Text);
    // Reset the data connector data source (resets bindings)
    _dc.DataSource = ds;
}
```

As noted previously, the binding source component 110 supports the ability to set its data source to a type, rather then a specific instance. For example, when the data source is changed, the binding source component 110 can evaluate whether the data source (e.g., object) can be instanced and whether the data source (e.g., object) supports necessary designer interface(s).

If the type isn't supported by the designer, using reflection, the binding source component 110 can interrogate the public properties of the type. Additionally, the binding source component 110 can analyze complex object(s) (e.g., Customer.Address.Line1).

In one example, internally, the binding source component 110 creates a types list of these objects and reports back the list of bindable properties. As control(s) 130 and other binding source(s) are connected, the binding source data source can be updated with a different object that either incorporates the same schema and/or provides a new schema.

For example, at design-time, a developer builds a form with control(s) data bound to a typed data set. Through the data binding, each control contains a reference to the typed data set scoped to the form. At run-time, as the end user of the application employs the control(s) (e.g., presses a button on the form), the application retrieves a new instance of the typed data set. The end user can switch the source of the data binding from, for example, a test database to a production database.

For example, the system 100 can be employed by a user (e.g., developer) developing an application that utilizes an entity 120 (e.g., business object and/or web service). The entity includes on or more public properties to which the user desires to bind to control(s) of a form on a design-time surface. In this example, the system 100 employs the binding source component 110 to access a customer object. The binding source component 110 can provide access view a type (e.g., customer object) and obtains its public property(ies) without actually instancing the object on the form designer. The DataGridView is bound to the customer object through the binding source component 110. The binding source component 110 represents the bindable items as substantially any public property of the customer object.

Simplifying the Creation of Editable Lists

Simple Binding List with Change Notification

In one example, a user desires to display a list of Customers in a DataGridView and provide editing of the current selection in simple controls. The user does not to have to create a binding list (e.g., an IBindingList) or implement change notification in his business objects. At design-time, using the system 100, the user can employ the binding source component 110 to implement this functionality, for example:

TABLE 2

```
_dc = new BindingSource( );
// Add Customers
_dc.Add(new Customer("555"));
_dc.Add(new Customer("456"));
```

TABLE 2-continued

```
__dc.Add(new Customer("111"));
// Binding Simple Control
this.lastNameTextBox.DataBindings.Add("Text", __dc, "LastName");
// Bind to the data connector (supported at design time)
this.customersDataGridView.DataSource = __dc;
```

The binding source component 110 can, for example, expose a list-based interface. An advantage of this approach over using an ArrayList is the binding source component 110 can support change notification on the item(s) within the list which doesn't occur with an ArrayList data source. In the example above, changes to the "LastName" property in the DataGridView can be automatically reflected in the "lastNameTextBox".

Extensible Add New

In one example, a user desires to use the "new row" functionality of the DataGridView. With the system 100, and more particularly, the binding source component 110, the user can directly add items to the binding source and add new functionality.

For example, with respect to a user that has moved to a web service-based architecture and the "add new" functionality of the binding source component 110 auto creates "new" items using Activator.CreateInstance. For example:

TABLE 3

```
public void Initialize( )
{
    __dc = new BindingSource( );
    // Add Customers
    __dc.Add(new Customer("555"));
    // Binding Simple Control
    this.lastNameTextBox.DataBindings.Add("Text", __dc, "LastName");
    // Binding Simple Control
    __dc.AddingNew += new
AddingNewEventHandler(DC__AddingNewEventHandler);
    // Bind to the data connector (supported at design time)
    this.customersDataGridView.DataSource = __dc;
}
private void DC__AddingNewEventHandler(object sender,
AddingNewEventArgs
e)
{
    // Set new item
    e.NewObject = __service.CreateNewCustomer( );
}
```

Design Time Support for Business Objects (Types)

Continuing with this example, the user's solution is working well, but the user has decided to go to complete web service architecture. The user is unable to "instance" the user's objects at design time (e.g., they come from a web service factory) but wants to be able to take advantage of the system 100 for data binding (e.g. configuring columns in a DataGridView). With the system 100, the user is able to bind to a type at design time (e.g., the Customer type returned from the Web Service) and setup binding based on the type information.

TABLE 4

```
public void Initialize( )
{
    // Design time setup
    __dc = new BindingSource( );
    // Design time (or run-time binding to type)
    __dc.DataSource = typeof(Customer);
}
```

Design Time Support for Currency

In accordance with an aspect of the subject invention, the system 100 can be employed to link currency-related events at design-time. For example, a user can desire to link to an event that fires when the "current" item in the grid changes. As discussed in greater detail below, the user can access a CurrentChanged event handler through the binding source component 110.

IEnumberable

In one example, the binding source component 110 can bind to an IEnumberable instance. For example, for performance reasons, a user can desire to do a query using a SqlDataReader. SqlDataReader returns an IEnumerable. Through the binding source component 110, the user is able to bind to the IEnumberable instance:

TABLE 5

```
__dc = new BindingSource( );
// Open SQLConnection
conn.Open( );
// Get Reader
SqlDataReader reader = cmd.ExecuteReader( );
// Binding IEnumerable
__dc.DataSource = reader;
// Close connection
conn.Close( );
// Close connection
this.businessDataGridView.DataSource = __dc;
```

Binding Source Object Model

An exemplary binding component 110 in accordance with an aspect of the subject invention is set forth in Table 6:

TABLE 6

```
namespace System.Windows.Forms
{
 [
    DefaultProperty("DataSource"),
    DefaultEvent("CurrentChanged"),
    ComplexBindingProperties("DataSource", "DataMember"),
 ]
 public class BindingSource : Component,
            IBindingListView, ITypedList, ICancelAddNew,
    ICurrencyManagerProvider
    {
        public BindingSource( );
        /// <summary>
        // Properties
        /// <summary>
```

TABLE 6-continued

```
    public object DataSource { get; set; }
    public string DataMember { get; set; }
    // BindingSource Properties
    public IList List { get; }
    public bool RaiseListChangedEvents { get; set; }
    // Currency Related Properties
    public int Count { get; }
    public int Position { get; set; }
    public bool IsSuspended { get; }
    // ICurrencyManagerProvider Properties
    public CurrencyManager CurrencyManager { get; }
    /// <summary>
    // Methods
    /// <summary>
    // BindingList Related Methods
    public void ResetBindings(bool shapeChanged);
    public void ResetCurrentItem( );
    public void ResetItem(int position);
    // Currency Related Methods
    public void MoveFirst( );
    public void MoveLast( );
    public void MovePrevious( );
    public void MoveNext( );
    public void EndEdit( );
    public void CancelEdit( );
    public void SuspendBinding( );
    public void ResumeBinding( );
    // Currency Related Methods (Current, All, None) - Default is Current
    /// <summary>
    // IBindingListView Properties
    /// <summary>
    public bool AllowEdit { get; set; }
    public bool AllowNew { get; set; }
    public bool AllowRemove { get; set; }
    public string Sort { get; set; }
    public string Filter { get; set; }
    public int Count { get; }
    /// <summary>
    // IBindingListView Methods
    /// <summary>
    public void RemoveFilter( );
    public int Find(PropertyDescriptor property, object key);
    public void RemoveSort( );
    public object AddNew( );
    public int Add(object value);
    public void Clear( );
    public bool Contains(object value);
    public int IndexOf(object value);
    public void Insert(int index, object value);
    public void Remove(object value);
    public void RemoveAt(int index);
    public void RemoveCurrent( );                    // Not part of
IBindingListView
    public object this[int index];
    public void CopyTo(Array array, int index);
    /// <summary>
    // Events
    /// <summary>
    public event ListChangedEventHandler              ListChanged;
    public event EventHandler                        CurrentChanged;
    public event EventHandler                        CurrentItemChanged;
    public event EventHandler                        PositionChanged;
    public event AddingNewEventHandler               AddingNew;
    public event BindingCompleteEventHandler
        BindingComplete;
    public event EventHandler                        DataSourceChanged;
    public event EventHandler
        DataMemberChanged;
    public event EventHandler
        CurrencyManagerChanged;
    /// <summary>
    // Private Implementations
    /// <summary>
    string ITypedList.GetListName(PropertyDescriptor[] accessors);
    PropertyDescriptorCollection
ITypedList.GetItemProperties(PropertyDescriptor[] accessors);
    bool IList.IsFixedSize { get; }
    bool IList.IsReadOnly { get; }
    bool ICollection.IsSynchronized { get; }
```

TABLE 6-continued

```
    object ICollection.SyncRoot { get; }
    bool IBindingList.AllowEdit { get; }
    bool IBindingList.AllowNew { get; }
    bool IBindingList.AllowRemove { get; }
    void IBindingList.ListSortDirection SortDirection { get; }
    void IBindingList.PropertyDescriptor SortProperty { get; }
    bool IBindingList.IsSorted { get; }
    bool IBindingList.SupportsChangeNotification { get; }
    bool IBindingList.SupportsSearching { get; }
    bool IBindingList.SupportsSorting { get; }
    ListSortDescriptionCollection IBindingListView.SortDescriptions { get; }
    bool IBindingListView.SupportsAdvancedSorting { get; }
    bool IBindingListView.SupportsFiltering { get; }
    IEnumerator IEnumerable.GetEnumerator( );
    void IBindingList.AddIndex(PropertyDescriptor property);
    void IBindingList.RemoveIndex(PropertyDescriptor property);
    void IBindingList.ApplySort(PropertyDescriptor property, ListSortDirection
direction);
    void IBindingListView.ApplySort(ListSortDescription[] sorts);
    void ICancelAddNew.EndNew(int position);
    void ICancelAddNew.CancelNew(int position);
    void ISupportInitialize.BeginInit( );
    void ISupportInitialize.EndInit ( );
    }
}
```

Exemplary Public Properties

DataSource Property (public object DataSource {get; set;})

In this example, the DataSource property refers to the data source for a particular DataManager. If the component is being initialized (in init), no processing takes place other than to set the internal data source. If the component is not being initialized, then the internal list (e.g., this.List) can be updated with the result of evaluating the DataSource.DataMember property, for example:

If DataMember is set but does not exist as a property on the new DataSource, the DataMember can be set to string.Empty and DataMemberChanged can be fired.

If DataMember is set to string.Empty and DataSource is an IListSource and "ContainsListCollection" is true, DataMember can be set to the property name of the first list in the IListSource and DataMemberChanged can be fired.

If DataSource is null, the internal list type can be set to object and the internal list can be set to an empty ArrayList.

If DataSource.DataMember evaluates to an instance (or DataSource evaluates to an instance if DataMember is not set), then the target list can be set to the list instance. The list item type can be set to the list type of the instance (via GetListType).

If DataSource.DataMember evaluates to an IEnumerable instance (or DataSource is an IEnumerable instance if DataMember is not set), then the target list can be an ArrayList of the IEnumerable items (the IEnumerable items copied into an ArrayList prior to any other DataSource processing). The list item type can be set to the type of the first item in the list. Note this is only for the scenario where the instance is IEnumerable and not IList.

If an instance is not available, the list item type can be set to the item type of DataSource.DataMember (or DataSource if DataMember is not set). This can use the static GetListType method (which supports Types). In addition, the internal list can be set to a new BindingList<item type>.

If an item is added when DataSource is null, then the item type is set to the newly added item type.

If the DataSource is an ICurrencyManagerProvider, the BindingSource can hook the DataSources's CurrentItemChanged and MetaDataChanged events. On CurrentItemChanged, the BindingSource will:

Reset the internal list (and fire a Reset event)

Apply deferred properties (Filter and Sort)

On MetaDataChanged the BindingSource will:

Reset the DataMember (if required)

Reset the internal list (and fire a PropertyDescriptorChanged)

Clear Filter and Sort values (set to null)

Events generated (in order):

DataSourceChanged (if changed)

DataMemberChanged (if changed)

CurrencyManagerChanged (if set)

Attributes:

Category("Data")

DefaultValue(null)

RefreshProperties(RefreshProperties.Repaint)

Editor(DataSourceEditor)

TypeConverter(DataSourceConverter)

Data Member Property (public string DataMember {get; set;}

The DataMember property refers to a data member for the particular DataManager. If the component is being initialized (in init), no processing takes place other than to set the internal data member. Otherwise, the internal list (this.List) can be updated with the result of evaluating DataSource.DataMember as described under the DataSource property.

Events Generated (in order):

DataMemberChanged (if changed)

Attributes:

Category("Data")

DefaultValue(" ")

RefreshProperties(RefreshProperties.Repaint)
Editor(DataMemberListEditor)
Currency Manager Property (public CurrencyManager {get;})

The CurrencyManager property refers to a CurrencyManager used by the particular DataManager. The CurrencyManager can provide currency on a BindingSoruce instance and is not be related to other CurrencyManagers. In this example, the CurrencyManager does not change during the lifetime of the BindingSource. This property is not be browsable in the property grid.

Count Property (public int Count {get;})

This property obtains the number of items in the list and returns the internal list Count. This property is not be browsable in the property grid.

Position Property (public int Position {get; set;})

This property gets or sets the position within the list. This property further returns CurrencyManager.Position and is will not be browsable in the property grid.

IsSuspended Property (public bool IsSuspended {get;})

This property returns true if list binding is suspended. The value can be based on CurrencyManager.IsBinding and is not be browsable in the property grid.

List Property (public IList List {get;})

This property returns the internal list resulting from evaluation of DataSource.DataMember (or DataSource if DataMember is not set). This property is not browsable in the property grid.

RaiseListChangedEvents Property (public bool RaiseListChangedEvents {get; set;})

When this property is false, it suspends the firing of list changed events. This property is not be browsable in the property grid. In this example, the default value is true.

AllowNew Property (public bool AllowNew {get; set;})

When this property is true (e.g., set), it allows new rows to be added via calls to "AddNew" as discussed in greater detail below. If AllowNew is not set and the underlying list is an IBindingList, this property delegates to the underlying list; otherwise if AllowNew is not set and the underlying list is not an IBindingList, this property will return false if the underlying list is a fixed size (e.g., list.IsFixedSize), is read only (e.g., list.IsReadOnly), does not have a default constructor or originated from an IEnumerable data source.

If AllowNew is set via the setter, the set value will be used. When set via the setter, a ListChanged reset event is fired. This property is browsable in the property grid.

If the underlying list is fixed size or read only, setting AllowNew to true causes an InvalidOperation exception.

When successful, AddNew sets the position to the position of the newly added item. When delegating to an underlying IBindingList, this property sets the position to Count-1.

AllowEdit (public bool AllowEdit {get; set;})

When true, this property allows list items to be edited. If AllowEdit is not set and the underlying list is an IBindingList, this property delegates to the underlying list; otherwise if this property is not set and the underlying list is not an IBindingList, this will return underlyingList.IsReadOnly.

If AllowEdit is set via the setter, the set value is used. When set via the setter, a ListChanged reset event is fired. This property is browsable in the property grid.

If the underlying list is read only, setting AllowEdit to true causes an InvalidOperation exception.

AllowRemove (public bool AllowRemove {get; set;})

When true, this property allows list item(s) to be removed from the list. If AllowRemove is hot set and the underlying list is an IBindingList, this property delegates to the underlying list; otherwise if this is not set and the underlying list is not an IBindingList, this will return underlyingList.IsFixedSize. If AllowRemove is set via the setter, the set value is used. When set via the setter, a ListChanged reset event is fired. This property is browsable in the property grid.

If the underlying list is read only or fixed size, setting AllowRemove to true causes an InvalidOperation exception.

Sort Property (public string Sort {get; set;})

The property specifies the "sort" property for the BindingSource. In this example, the Sort property is of the form: "ColumnName [ASC|DESC] [, . . . ]". If any of the Sort properties do not exist on the underlying list or if the Sort string is malformed, the BindingSource throws an ArgumentException. If there are multiple columns specified and the underlying list does not support advanced sorting (e.g., SupportsAdvancedSorting=false) or if the underlying list does not support sorting (e.g., SupportsSorting=false or not an IBindingList), the BindingSource throws a NotSupported exception.

If the internal list is an IBindingListView, this property sets the "SortDescriptions" property on the internal list (previous Sorts will be cleared). If the internal list is an IBindingList, this property sets the "SortProperty" and the "SortDirection" on the underlying list.

The Sort getter returns the value set via the setter (or null if it has not been set). The Sort getter does not retrieve the value from the underlying BindingListView. The BindingSource only sets the underlying BindingListViews Sort properties when the Sort value is non-null.

When called during initialization, the property set will be deferred until post initialization. The default value is null and this property is browsable in the property grid.

Filter (public string Filter {get; set;})

This property specifies the "Filter" property for the BindingSource. When non-null (the default is null) the BindingSource passes the "Filter" property to the underlying BindingListView.

If the internal list is an IBindingListView and Filter is non-null, this property sets the "Filter" property on the internal list. If the internal list does not support Filtering, this property throws a "NotSupported" exception.

The Filter getter gets the "Filter" property set via the setter. This does not get the underlying BidingListView's Filter property.

When called during initialization, the property set will be deferred until post initialization. The default value is null and this property is browsable in the property grid.

Exemplary Private Property Implementations

IList, ICollection and IEnumerable

The private implementations of these interfaces delegate to the underlying list including:

IsFixedSize
IsReadOnly
IsSychronized
SyncRoot
IBindingListView.SortDirection

This interface delegates to the underlying IBindingList. If the underlying list is not an IBindingList this returns ListSortDirection.Ascending.

IBindingListView.SortProperty

This interface delegates to the underlying IBindingList. If the underlying list is not an IBindingList this returns null.

IBindingListView.AddIndex

This interface delegates to the underlying IBindingList. If the underlying list is not an IBindingList this interface throws an "NotSupported" exception.

IBindingListView.RemoveIndex

This interface delegates to the underlying IBindingList. If the underlying list is not an IBindingList this interface throws an "NotSupported" exception.

IBindingListView.IsSorted

This interface delegates to the underlying IBindingList. If the underlying list is not an IBindingList this returns false.

IBindingListView.SupportsChangeNotification

Returns true.

IBindingListView.SupportsSearching

This interface delegates to the underlying IBindingList. If the underlying list is not an IBindingList this returns false.

IBindingListView.SupportsSorting

This interface delegates to the underlying IBindingList. If the underlying list is not an IBindingList this returns false.

IBindingListView.SortDescriptions

This interface delegates to the underlying IBindingListView. If the underlying list is not an IBindingListView this returns null.

IBindingListView.SupportsAdvancedSorting

This interface delegates to the underlying IBindingListView. If the underlying list is not an IBindingListView this returns false.

IBindingListView.SupportsFiltering

This interface delegates to the underlying IBindingListView. If the underlying list is not an IBindingListView this returns false.

IBindingList.AllowEdit

See the public AllowEdit method description below.

IBindingList.AllowNew

See the public AllowNew method description below.

IBindingList.AllowRemove

See the public AllowRemove method description below.

Exemplary Public Methods

ResetBindings (public void ResetBindings(bool shapeChanged))

This method causes control(s) bound to this BindingSource's list to refresh their values (e.g., causes the BindingSource to fire a ListChanged event of type Rest). If "shapechanged" is true, this causes bound controls to refresh their list shape meta-data associated with this data source (e.g., fires a ListChanged event of type PropertyDescriptorChanged).

ResetCurrentItem (public void ResetCurrentItem( ))

This method causes control(s) bound to this BindingSource's current item to refresh their values (e.g., causes the BindingSource to fire a ListChanged event of type ItemChanged at the current position).

ResetItem (public void ResetItem(int position))

This method causes the BindingSource to fire a ListChanged event of type ItemChanged with the position specified by "position".

MoveFirst (public void MoveFirst( ))

This method sets the current item to be the first item in the list (e.g., sets CurrencyManager.Position to 0).

MoveLast (public void MoveLast( ))

This method sets the current item to be the last item in the list (e.g., sets CurrencyManager.Position to the last item in the list).

MoveNext (public void MoveNext( ))

This method sets the current item to be the next item in the list (e.g., increments the CurrencyManager position).

MovePrevious (public void MovePrevious( ))

This method sets the current item to be the previous item in the list (e.g., decrements the CurrencyManager position).

RemoveCurrent (public void RemoveCurrent( ))

This method removes the current item (from a CurrencyManager perspective) from the internal list (e.g., calls Remove(this.Current)). If the list is empty, this method throws an InvalidOperationException.

EndEdit (public void EndEdit( ))

This method commits the current edit (e.g., call through to CurrencyManager.EndCurrentEdit( )).

CancelEdit (public void CancelEdit( ))

This method cancels the current edit (e.g., call through to CurrencyManager.CancelCurrentEdit( )).

SuspendBinding (public void SuspendBinding( ))

This method suspends binding on the underlying CurrencyManager (e.g., call through to CurrencyManager.SuspendBinding( )).

ResumeBinding (public void ResumeBinding( ))

This method resumes binding on the underlying CurrencyManager (e.g., call through to CurrencyManager.ResumeBinding( )).

BindingListView Methods

AddNew (public void AddNew( ))

This method adds a new item to the list. It first calls "this.EndEdit" and then fires the AddingNew event. If an item is returned from the AddNew event it is added to the binding list. If AddingNew is not handled and the underlying list is an IBindingList, this method delegates to the underlying list's AddNew( ). If the underlying list is not an IBindingList, then CreateInstance is called on the item type and the result is added to the list. The new item can be rolled back by calling CancelNew (or CurrencyManager.CancelCurrentEdit). The new item is committed by calling EndNew (or CurrencyManager.EndCurrentEdit). If this.AllowNew is false, this method throws throw an "InvalidOperation" exception.

RemoveFilter (public void RemoveFilter( ))

This method removes the deferred filter property (if set) and if the underlying list is an IBindingListView this method calls through to the list's RemoveFilter( ) method.

Find (public int Find(PropertyDescriptor property, object key))

This method returns the index of the item in the list and delegates to the internal list's Find method. If the underlying list is not an IBindingList, this method throws a NotSupported exception.

RemoveSort (public void RemoveSort( ))

This method removes the deferred sort property (if set) and if the underlying list is an IBindingListView it calls through to the list's RemoveSort( ) method.

Add (public void Add(object value))

This method adds an item to the list and delegates to the underlying list's "Add" method.

Clear (public void Clear( ))

This method clears the list and delegates to the underlying list's "Clear" method.

Contains (public bool Contains(object value))

This method returns true if the value is contained in the underlying list and delegates to the underlying list's "Contains" method.

IndexOf (public int IndexOf(object value))

This method returns the index of the given value and delegates to the underlying list's "Indexof" method.

Insert (public void Insert(int index, object value))

This method inserts the item into the list at the given index and delegates to the underlying list's "Insert" method.

RemoveAt (public void RemoveAt(int index))

This method removes the item from the list and delegates to the underlying list's "RemoveAt" method.

Remove (public void Remove(object value))

This method removes the item from the list and delegates to the underlying list's "Remove" method.

Indexer (public object this[int index])

This method returns the item at the given index and delegates to the underlying list's Indexer.

CopyTo (public void CopyTo(Array array, int index))

This method delegates to the underlying list's CopyTo method.

ITypedList Methods

GetListName Method string ITypedList.GetListName(PropertyDescriptor[] accessors);

This method gets the list name of the internal list and calls through to the static GetListName method on BindingListHelper.

GetItemProperties Method

PropertyDescriptorCollection GetItemProperties(PropertyDescriptor[] accessors);

This method gets the item properties for the internal list and calls through to the static GetListItemProperties method on BindingListHelper. At design time, the DataMember picker only shows data members for the BindingSource under the following conditions:

DataMember is not set

DataSource is a BindingSource

DataSource is not an IList (or IListSource)

DataSource is not a type of IList

DataSource is an IListSource with ContainsListCollection set to true

In this example, the design goal is to force relationships to be created through parent BindingSources rather than directly through parent ILists.

Private IBindingListView Method Implementations

IEnumerable.GetEnumerator( )

This method delegates to the internal lists GetEnumerator( ).

IBindingListView.AddIndex

This method delegates to the underlying IBindingList. If the underlying list is not an IBindingList, this method throws a "NotSupported" exception.

IBindingListView.RemoveIndex

This method delegates to the underlying IBindingList. If the underlying list is not an IBindingList, this method throws a "NotSupported" exception.

IBindingList.ApplySort

This method delegates to the underlying IBindingList. If the underlying list is not a IBindingList, this method throws a "NotSupported" exception.

IBindingListView.ApplySort

This method delegates to the underlying IBindingListView. If the underlying list is not an IBindingListView, this method throws a "NotSupported" exception.

ISupportInitialize Methods

BeginInit Method (void ISupportInitialize.BeginInit( );)

This method suspends list change events. This suspends list changed events (via RaiseListChangedEvents) and suspends processing of sets to DataSource and DataMember. In addition, this suspends processing of the following properties:

Filter

Sort

These properties can be processed post EndInit( )

EndInit Method (void ISupportInitialize.EndInit( );)

This method ends initialization which resumes list change events. In EndInit, the BindingSource will verify dependent BindingSources are initialized (if this.DataSource is a BindingSource the BindingSources EndInit will be called) and then process deferred properties:

Evaluation of DataSource/DataMember (if changed during initialization)

Processing of deferred properties (Filter and Sort)

ICancelAddNew Methods

ICancelAddNew.EndNew Method void ICancelAddNew.EndNew(int position)

This method commits the outstanding AddNew operation if the position is the position of the "add new" row. This is called by the CurrencyManager on a calls to CurrencyManager.EndCurrentEdit( ).

ICancelAddNew.CancelNew Method void ICancelAddNew.CancelNew(int position)

This method rolls back the outstanding AddNew operation. If there is an un-committed "add new" item, and the position is equal to the position of the "add new" item, this will remove the uncommitted "add new" item from the list. This is called by the CurrencyManager on a call to CurrencyManager.CancelCurrentEdit( ).

Public Events

ListChanged Event public event ListChangedEventHandler ListChanged;

This event is fired as a result of changes in the underlying list (item added, item removed, item deleted, meta-data changed). This event is not be browsable in the property grid.

BindingSource automatically raises ListChanged events of type ItemChanged on the "Current" item when the underlying list does not support change notification (is either not an IBindingList or supports IRaiseItemChangedEvents and RaisesItemChangedEvents is false).

When automatically raising ListChanged events, the BindingSource hooks ComponentModel.ValueChanged events on the Current item.

CurrentChanged Event public event EventHandler CurrentChanged;

This event is fired when this.CurrencyManager.CurrentChanged fires. The CurrencyManager fires this event when the current item value changes.

CurrentItemChanged Event public event EventHandler CurrentItemChanged;

This event is fired when this.CurrencyManager.CurrentItemChanged fires. The CurrencyManager fires this event when a property on the current item changes.

PositionChanged Event public event EventHandler PositionChanged;

This event is fired when this.CurrencyManager.PositionChanged fires. The CurrencyManager fires this event when its position changes.

AddingNew Event public event AddingNewEventHandler AddingNew;

This event is fired when the AddNew method is called. This event provides an extensibility point to allow users to override AddNew functionality without having to sub-class the BindingSource.

BindingComplete Event public event BindingCompleteEventHandler BindingComplete;

This event is fired when this.CurrencyManager.BindingComplete fires. The CurrencyManager fires BindingComplete at the completion of a binding operation for all controls bound to this BindingSource.

DataSourceChanged Event public event EventHandler DataSourceChanged;

This event is fired when the DataSource value changes.

DataMemberChanged Event public event EventHandler DataMemberChanged;

This event is fired when the DataMember value changes.
CurrencyManagerChanged Event
Public Event EventHandler CurrencyMangerChanged;
This event is fired when the CurrencyManager value changes.

Figure 2:
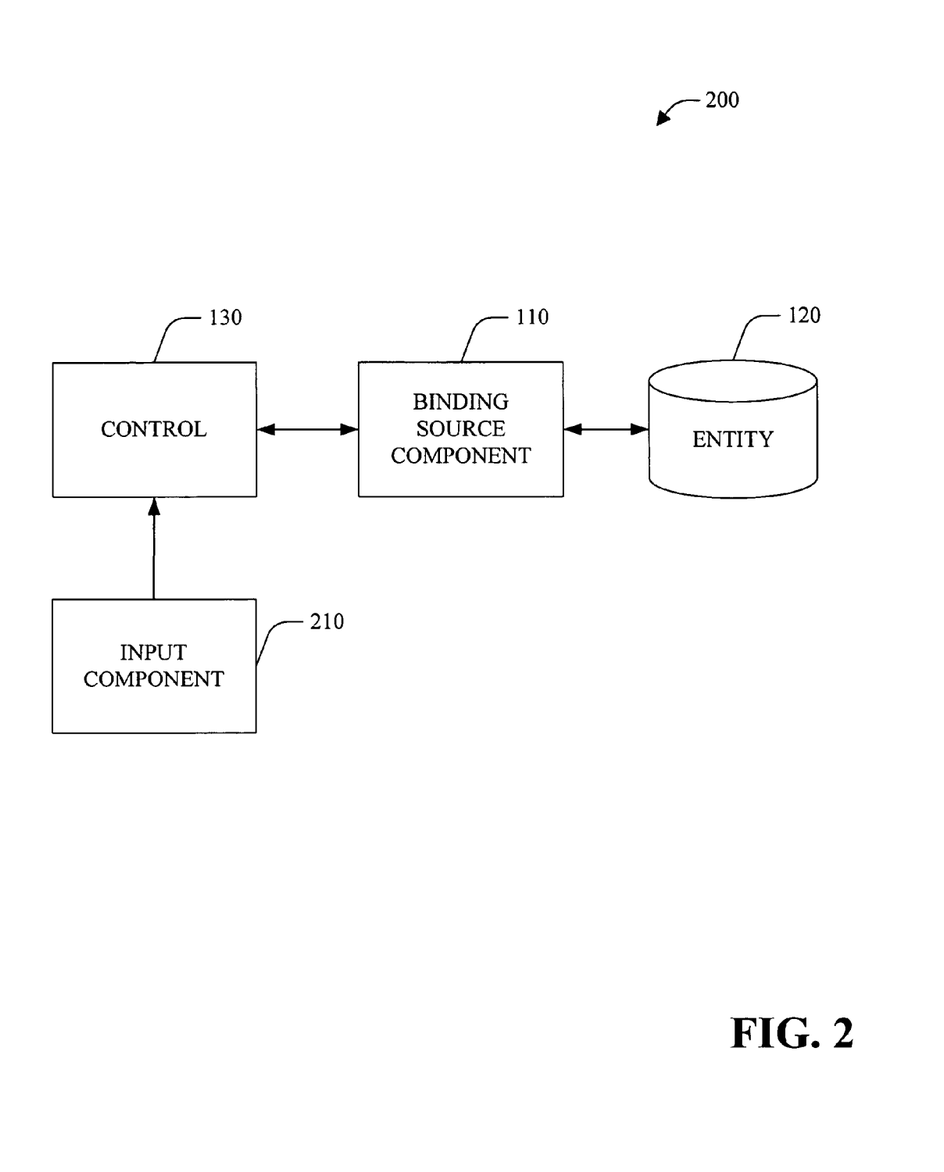
FIG. 2 is a block diagram of a system for data binding to a type of object in accordance with an aspect of the subject invention.

Turning briefly to FIG. 2, a system 200 for data binding to a type of object in accordance with an aspect of the subject invention is illustrated. The system 200 includes a binding source component 110, an entity 120, a control 130 and an input component 210.

The input component 210 can receive user input (e.g., from a developer and/or end-user) that facilitates configuration of the control 130 and/or modification(s) to data of the binding source component 110 and/or the entity 120. The input component 210 can include, for example, a mouse, key board, trackball and/or stylus.

It is to be appreciated that the system 100, the binding source component 110, the entity 120, the control 130, the system 200 and/or the input component 210 can be computer components as that term is defined herein.

Figure 3:
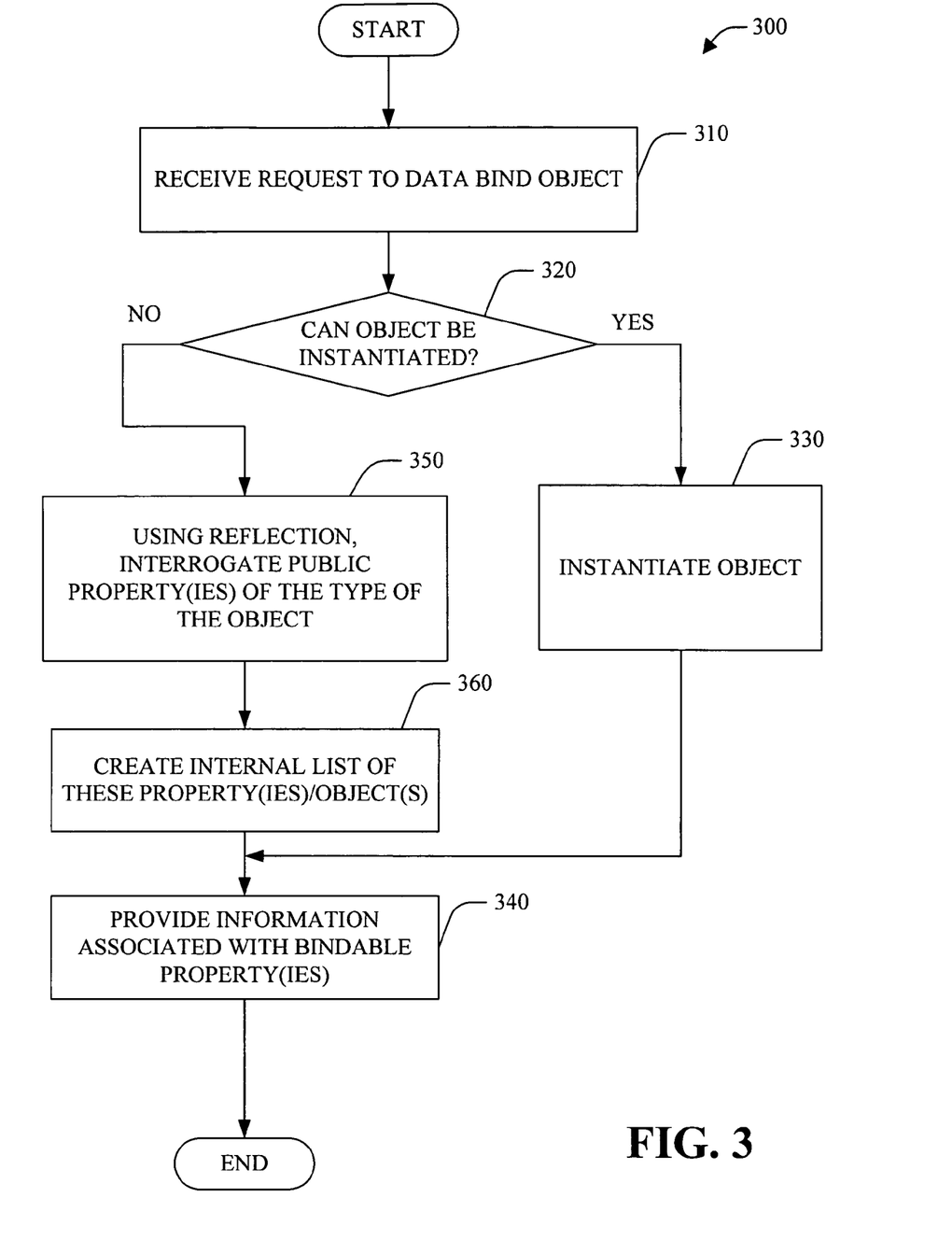
FIG. 3 is a flow chart of a method facilitating data binding to a type of object in accordance with an aspect of the subject invention.
Figure 4:
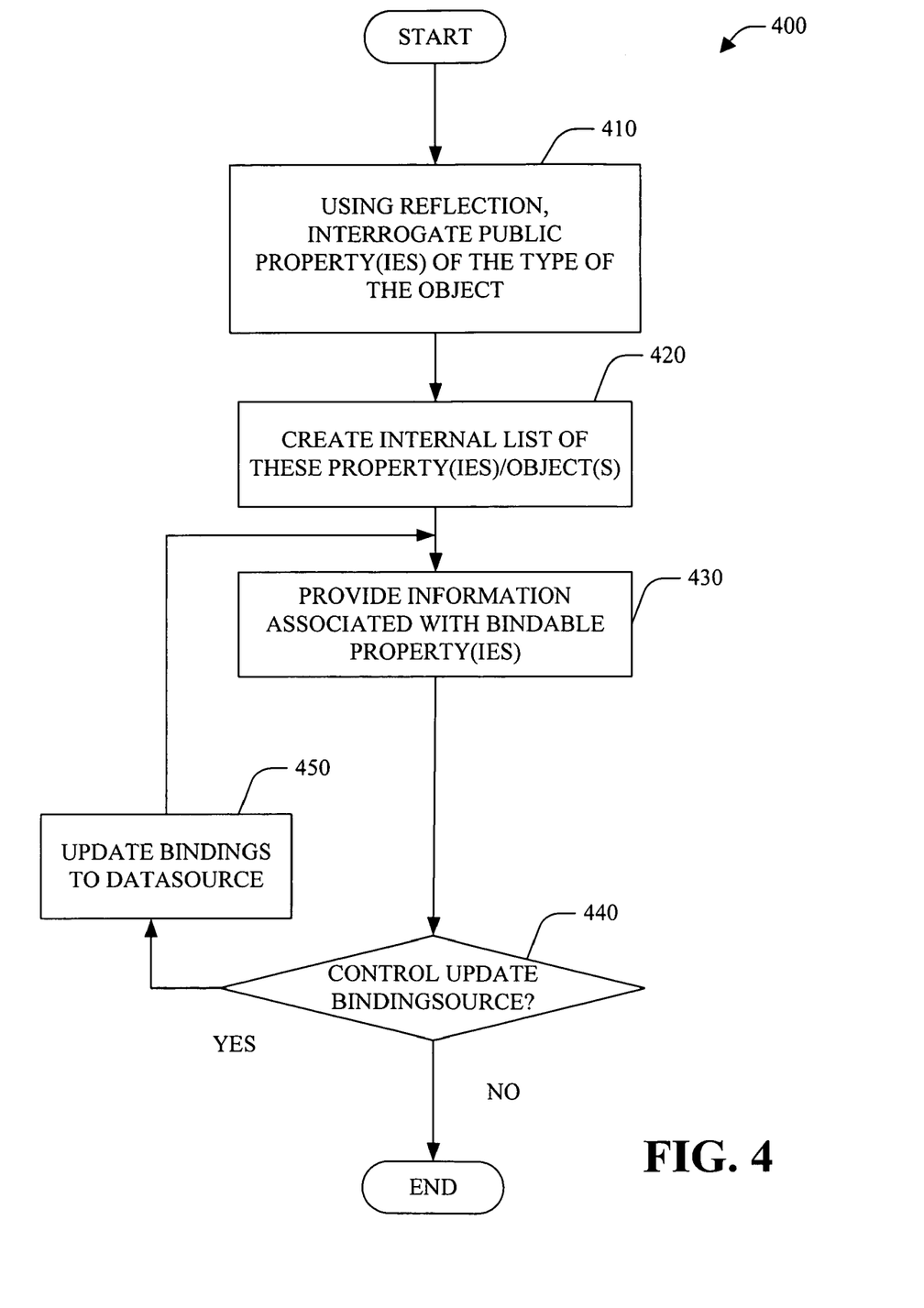
FIG. 4 is a flow chart of a method facilitating data binding to a type of object in accordance with an aspect of the subject invention.

Turning briefly to FIGS. 3 and 4, methodologies that may be implemented in accordance with the subject invention are illustrated. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The subject invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 3, a method 300 facilitating data binding to a type of object in accordance with an aspect of the subject invention is illustrated. At 310, a request to data bind an object is received. At 320, a determination is made as to whether the object can be instantiated. If the determination at 320 is YES, at 330, the object is instantiated. At 340, information associated with bindable property(ies) is provided, and, no further processing occurs. If the determination at 320 is NO, at 350, using reflection, public property(ies) of the type of the object are interrogated. At 360, an internal list of these property(ies)/object(s) is created and processing continues at 340.

Next, turning to FIG. 4, a method 400 facilitating data binding to a type of object in accordance with an aspect of the subject invention is illustrated. At 410, using reflection, property(ies) of the type of the object are interrogated. At 430, an internal list of these property(ies)/object(s) is created. At 430, information associated with bindable property(ies) is provided.

At 440, a determination is made as to whether a control has updated the bindingsource (e.g., internal list). If the determination at 440 is YES, at 450, the bindings are updated to the datasource and processing continues at 430. If the determination at 440 is NO, no further processing occurs.

Figure 5:
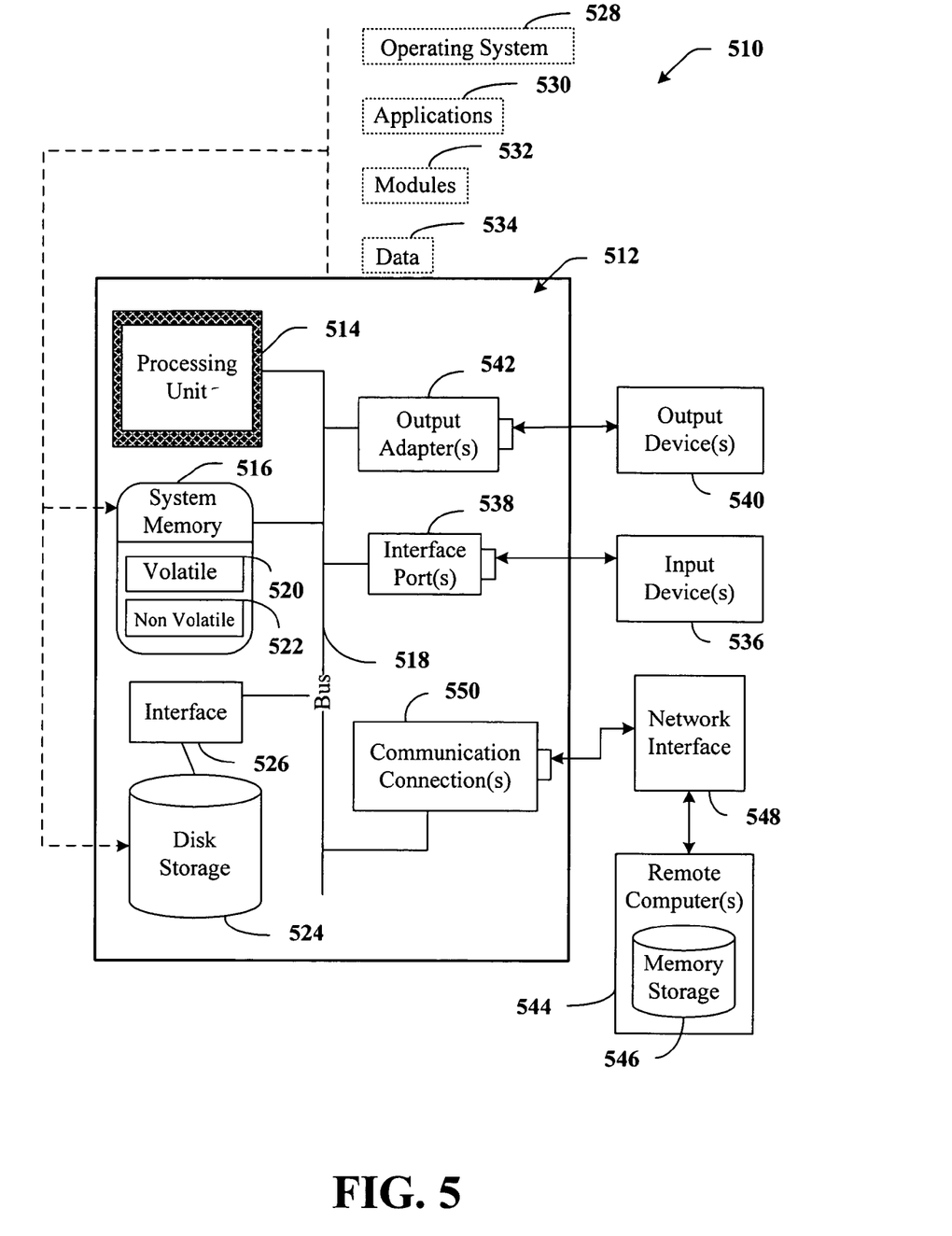
FIG. 5 illustrates an example operating environment in which the invention may function.

In order to provide additional context for various aspects of the subject invention, FIG. 5 and the following discussion are intended to provide a brief, general description of a suitable operating environment 510 in which various aspects of the subject invention may be implemented. While the subject invention is described in the general context of computer-executable instructions, such as program modules, executed by one or more computers or other devices, those skilled in the art will recognize that the subject invention can also be implemented in combination with other program modules and/or as a combination of hardware and software. Generally, however, program modules include routines, programs, objects, components, data structures, etc. that perform particular tasks or implement particular data types. The operating environment 510 is only one example of a suitable operating environment and is not intended to suggest any limitation as to the scope of use or functionality of the subject invention. Other well known computer systems, environments, and/or configurations that may be suitable for use with the subject invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 5, an exemplary environment 510 for implementing various aspects of the subject invention includes a computer 512. The computer 512 includes a processing unit 514, a system memory 516, and a system bus 518. The system bus 518 couples system components including, but not limited to, the system memory 516 to the processing unit 514. The processing unit 514 can be any of various available processors. Dual microprocessors and other multiprocessor architectures also can be employed as the processing unit 514.

The system bus 518 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 516 includes volatile memory 520 and nonvolatile memory 522. The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable ROM (EEPROM), or flash memory. Volatile memory 520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 512 also includes removable/nonremovable, volatile/nonvolatile computer storage media. FIG. 5 illustrates, for example a disk storage 524. Disk storage 524 includes, but is not limited to, devices like a magnetic disk drive, floppy disk drive, tape drive, Jaz drive, Zip drive, LS-100 drive, flash memory card, or memory stick. In addition, disk storage 524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used such as interface 526.

It is to be appreciated that FIG. 5 describes software that acts as an intermediary between users and the basic computer resources described in suitable operating environment 510. Such software includes an operating system 528. Operating system 528, which can be stored on disk storage 524, acts to control and allocate resources of the computer system 512. System applications 530 take advantage of the management of resources by operating system 528 through program modules 532 and program data 534 stored either in system memory 516 or on disk storage 524. It is to be appreciated that the subject invention can be implemented with various operating systems or combinations of operating systems.

A user enters commands or information into the computer 512 through input device(s) 536. Input devices 536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 514 through the system bus 518 via interface port(s) 538. Interface port(s) 538 include, for example, a serial port, a parallel port, a game port, and a universal serial bus (USB). Output device(s) 540 use some of the same type of ports as input device(s) 536. Thus, for example, a USB port may be used to provide input to computer 512, and to output information from computer 512 to an output device 540. Output adapter 542 is provided to illustrate that there are some output devices 540 like monitors, speakers, and printers among other output devices 540 that require special adapters. The output adapters 542 include, by way of illustration and not limitation, video and sound cards that provide a means of connection between the output device 540 and the system bus 518. It should be noted that other devices and/or systems of devices provide both input and output capabilities such as remote computer(s) 544.

Computer 512 can operate in a networked environment using logical connections to one or more remote computers, such as remote computer(s) 544. The remote computer(s) 544 can be a personal computer, a server, a router, a network PC, a workstation, a microprocessor based appliance, a peer device or other common network node and the like, and typically includes many or all of the elements described relative to computer 512. For purposes of brevity, only a memory storage device 546 is illustrated with remote computer(s) 544. Remote computer(s) 544 is logically connected to computer 512 through a network interface 548 and then physically connected via communication connection 550. Network interface 548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/software employed to connect the network interface 548 to the bus 518. While communication connection 550 is shown for illustrative clarity inside computer 512, it can also be external to computer 512. The hardware/software necessary for connection to the network interface 548 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for data binding to a type of an object in a run-time environment, the system comprising:
   a processor coupled to a memory;
   a control having an associated visual representation;
   a binding source component binding the control and the type of the object rather than an instance of the object, the binding source component comprising:
   abstracting a schema associated with the type of the object;
   determining whether the object of the bounded type can be instantiated;
   if the object cannot be instantiated:
      interrogating a public properties of the type of the object using reflection to ascertain bindable properties, and creating an internal list of the bindable properties;
   instantiating the object;
   providing information associated with the bindable properties to the control upon the instantiation, the information including the bindable properties of the object that conform with at least a portion of the abstract schema;
   determining whether the control has updated the internal list;
   updating the binding to an underlying data source, if the control has updated the internal list; and
   exchanging the bound object with a subsequent object of the same type, the subsequent object including bindable properties that also conform with at least a portion of the abstract schema.

2. The system of claim 1 employed in a software application development environment.

3. The system of claim 1, the binding source component facilitating access to a type of object.

4. The system of claim 1, another object substituted for the object by modifying the bindable properties stored in the binding source component.

5. The system of claim 1, the entity comprising a business object.

6. The system of claim 1, the entity comprising a web service.

7. The system of claim 1, the entity comprising a hierarchy of objects.

8. The system of claim 1, the binding source component exposes a list-based interface.

9. The system of claim 8, the binding source component supports change notification of an item within a list of the binding source component.

10. The system of claim 1, the binding source component provides at least one of a DataSource property, a DataMember property, a CurrencyManager property, a Count property, a Position property, an IsSuspended property, a List property, a RaiseListChangedEvents property, an AllowNew property, an AllowEdit property, an AllowRemove property, a Sort property, and, a Filter property.

11. The system of claim 1, the binding source component provides at least one of a ResetBindings method, a ResetCurrentitem method, a ResetItem method, a MoveFirst method, a MoveLast method, a MoveNext method, a MovePrevious method, a RemoveCurrent method, an EndEdit method, a CancelEdit method, a SuspendBinding method, and, a ResumeBinding method.

12. The system of claim 1, the binding source component provides at least one of an AddNew method, a RemoveFilter method, a Find method, a RemoveSort method, an Add method, a Clear method, a Contains method, an IndexOf method, an Insert method, a RemoveAt method, a Remove method, an Indexer method, and, a CopyTo method.

13. The system of claim 1, the binding source component provides at least one of a GetListName method and a GetItemProperties Method.

14. The system of claim 1, the binding source component provides at least one of a ListChanged event, a CurrentChanged event, a CurrentItemChanged event, a PositionChanged event, an AddingNew event, a BindingComplete event, a DataSourceChanged event, a DataMemberChanged event, and, a CurrencyManagerChanged event.

15. A computer-implemented method facilitating data binding to a type of an object in a run-time environment, the method comprising:
providing a visual representation associated with a control;
binding the control to the type of the object rather than an instance of the object;
abstracting a schema associated with the type of the object;
determining the object of the bounded type can be instantiated;
if the object cannot be instantiated:
  interrogating a public properties of the type of the object to ascertain bindable properties, and
  creating an internal list of the bindable properties;
instantiating the object;
providing information associated with the bindable properties to the control upon the instantiation, the information including the bindable properties of the object that conform with at least a portion of the abstract schema;
determining whether the control has updated the internal list;
updating the binding to an underlying data source, if the control has updated the internal list; and
exchanging the bound object with a subsequent object of the same type, the subsequent object including bindable properties that also conform with at least a portion of the abstract schema.

16. A computer readable medium having stored thereon computer executable instructions for carrying out the method of claim 15.

17. A computer readable medium storing computer executable components of a system for data binding to a type of object in a run-time environment, comprising:
a control having an associated visual representation;
a binding source component binding the control and the type of the object rather than an instance of the object, the binding source component comprising:
  abstracting a schema associated with the type of the object;
  determining whether the object of the bounded type can be instantiated;
  if the object cannot be instantiated:
    interrogating a public properties of the type of the object using reflection to ascertain bindable properties, and
    creating an internal list of the bindable properties;
  instantiating the object;
  providing information associated with the bindable properties to the control upon the instantiation, the information including the bindable properties of the object that conform with at least a portion of the abstract schema;
  determining whether the control has updated the internal list;
  updating the binding to an underlying data source, if the control has updated the internal list; and
  exchanging the bound object with a subsequent object of the same type, the subsequent object including bindable properties that also conform with at least a portion of the abstract schema.

18. A system for data binding to a type of an object in a run-time environment, the system has a processor coupled to a memory, comprising:
means for providing a visual representation associated with a control;
means for binding the control to the type of the object rather than an instance of the object;
means for abstracting a schema associated with the type of the object;
means for determining the object of the bounded type can be instantiated;
if the object cannot be instantiated:
  means for interrogating a public properties of the type of the object to ascertain bindable properties, and
  means for creating an internal list of the bindable properties;
means for instantiating the object;
means for providing information associated with the bindable properties to the control upon the instantiation, the information including bindable properties of the object that conform with at least a portion of the abstract schema;
means for determining whether the control has updated the internal list;
means for updating the binding to an underlying data source, if the control has updated the internal list; and
means for exchanging the bound object with a subsequent object of the same type, the subsequent object including bindable properties that also conform with at least a portion of the abstract schema.

* * * * *